(12) United States Patent
Hatano

(10) Patent No.: US 11,008,789 B2
(45) Date of Patent: May 18, 2021

(54) BIAXIAL HINGE

(71) Applicant: Sugatsune Kogyo Co., Ltd., Tokyo (JP)

(72) Inventor: Yuuichi Hatano, Tokyo (JP)

(73) Assignee: SUGATSUNE KOGYO CO., LTD., Tokyo (JP)

( * ) Notice: Subject to any disclaimer, the term of this patent is extended or adjusted under 35 U.S.C. 154(b) by 0 days.

(21) Appl. No.: 16/344,783

(22) PCT Filed: Sep. 6, 2017

(86) PCT No.: PCT/JP2017/032021
§ 371 (c)(1),
(2) Date: Apr. 24, 2019

(87) PCT Pub. No.: WO2018/079085
PCT Pub. Date: May 3, 2018

(65) Prior Publication Data
US 2020/0040626 A1    Feb. 6, 2020

(30) Foreign Application Priority Data
Oct. 24, 2016  (JP) .............................. JP2016-207441

(51) Int. Cl.
E05D 3/12 (2006.01)
E05D 5/12 (2006.01)
(Continued)

(52) U.S. Cl.
CPC ................ E05D 3/12 (2013.01); E05D 5/12 (2013.01); E05D 11/082 (2013.01);
(Continued)

(58) Field of Classification Search
CPC .. E05D 3/12; E05D 5/12; E05D 5/128; E05D 11/082; E05D 11/084; E05D 11/1014;
(Continued)

(56) References Cited

U.S. PATENT DOCUMENTS 5,697,125 A * 12/1997 Gannon ................ E05D 11/082
16/342
6,301,748 B1 * 10/2001 Su-Man ................ G06F 1/1616
16/337
(Continued)

FOREIGN PATENT DOCUMENTS

JP    S59-127917 U    8/1984
JP    H11-148266 A    6/1999
(Continued)

OTHER PUBLICATIONS

ISA/JPO, International Search Report dated Dec. 12, 2017 in International Application No. PCT/JP2017/032021, total 4 pages with English translation.
(Continued)

Primary Examiner — William L Miller
(74) Attorney, Agent, or Firm — Masuvalley & Partners

(57) ABSTRACT

A biaxial hinge which can be downsized. The biaxial hinge includes a first main body, an intermediate body coupled to the first main body so that the intermediate body can rotate around a first shaft and a second main body coupled to the intermediate body so that the second main body can rotate around a second shaft which is parallel with the first shaft. Two laminated first friction plates are engaged with the first shaft. Two laminated second friction plates are engaged with the second shaft. The first main body supports the first shaft so that the first shaft cannot rotate. The second main body supports the second shaft so that the second shaft cannot rotate. The first friction plates and the second friction plates are contained in the intermediate body so that the first friction plates and the second friction plates cannot rotate.

7 Claims, 6 Drawing Sheets

(51) Int. Cl.
E05D 11/08 (2006.01)
G06F 1/16 (2006.01)

(52) U.S. Cl.
CPC ........ *G06F 1/1681* (2013.01); *E05Y 2900/20* (2013.01); *E05Y 2900/606* (2013.01); *Y10T 16/547* (2015.01); *Y10T 16/54038* (2015.01)

(58) Field of Classification Search
CPC .............. E05D 11/1078; E05D 11/087; E05D 2900/20; E05D 2900/606; E05D 2005/106; G06F 1/1616; G06F 1/1681; Y10T 16/5403; Y10T 16/54038; Y10T 16/547; H04M 1/022; F16C 11/04; F16C 11/10
USPC .............. 16/337, 342, 366; 361/679.27; 455/575.3; 379/433.13
See application file for complete search history.

(56) References Cited

U.S. PATENT DOCUMENTS

| | | | | |
|---|---|---|---|---|
| 6,467,129 B1* | 10/2002 | Bae | ............ | B60J 3/0265 16/308 |
| 7,257,863 B2* | 8/2007 | Horng | ............ | E05D 5/12 16/342 |
| 8,230,554 B2* | 7/2012 | Chu | ............ | E05D 11/087 16/337 |
| 8,245,356 B2* | 8/2012 | Chu | ............ | G06F 1/1681 16/342 |
| 8,776,319 B1* | 7/2014 | Chang | ............ | G06F 1/1681 16/303 |
| 8,914,946 B2* | 12/2014 | Hsu | ............ | F16H 21/44 16/342 |
| 9,057,215 B1* | 6/2015 | Horng | ............ | E05D 3/12 |
| 9,206,633 B1* | 12/2015 | Ju | ............ | G06F 1/1681 |
| 9,274,566 B1* | 3/2016 | Horng | ............ | G06F 1/1681 |
| 9,439,311 B2* | 9/2016 | Hsu | ............ | E05D 3/122 |
| 9,547,342 B2* | 1/2017 | Horng | ............ | G06F 1/1681 |
| 9,683,398 B2* | 6/2017 | Chuang | ............ | E05D 11/1078 |
| 9,790,720 B2* | 10/2017 | Jenum | ............ | E05D 11/082 |
| 10,151,128 B2* | 12/2018 | Hatano | ............ | G06F 1/1681 |
| 10,309,442 B2* | 6/2019 | Chiang | ............ | E05D 11/084 |
| 10,563,438 B1* | 2/2020 | Chen | ............ | E05D 5/10 |
| 2002/0144378 A1* | 10/2002 | Liao | ............ | G06F 1/1616 16/342 |
| 2007/0094845 A1* | 5/2007 | Chang | ............ | H04M 1/0216 16/342 |
| 2007/0101543 A1* | 5/2007 | Lu | ............ | G06F 1/1616 16/342 |
| 2007/0283534 A1 | 12/2007 | Chang et al. | | |
| 2008/0151478 A1* | 6/2008 | Chern | ............ | G06F 1/1616 361/679.27 |
| 2011/0232032 A1* | 9/2011 | Chu | ............ | G06F 1/1681 16/221 |
| 2013/0318746 A1* | 12/2013 | Kuramochi | ............ | G06F 1/1681 16/342 |
| 2014/0059805 A1* | 3/2014 | Krahn | ............ | G06F 1/1681 16/342 |
| 2015/0040353 A1* | 2/2015 | Chen | ............ | G06F 1/1681 16/366 |
| 2015/0071735 A1* | 3/2015 | Jenum | ............ | F16B 2/24 411/517 |

FOREIGN PATENT DOCUMENTS

| | | |
|---|---|---|
| JP | 2000-501149 A | 2/2000 |
| JP | 2003-120649 A | 4/2003 |
| JP | 2013-023936 A | 2/2013 |
| JP | 2014-062396 A | 4/2014 |
| JP | 2014-62595 A | 4/2014 |
| WO | 2010/100843 A1 | 9/2010 |

OTHER PUBLICATIONS

Supplementary European Search Report dated May 27, 2020, issued in European Patent Application No. 17865075.0, total 6 pages.

* cited by examiner

BIAXIAL HINGE

RELATED APPLICATIONS

This application is the U.S. National Phase of and claims priority to International Patent Application No. PCT/JP2017/032021, International Filing Date Sep. 6, 2017; which claims benefit of Japanese Patent Application No. 2016-207441 filed Oct. 24, 2016; both of which are incorporated herein by reference in their entireties.

TECHNICAL FIELD

The present invention relates to a biaxial hinge including a first main body, an intermediate body coupled to the first main body so that the intermediate body can rotate around a first shaft and a second main body coupled to the intermediate body so that the second main body can rotate around a second shaft which is in parallel with the first shaft.

BACKGROUND ART

Since a biaxial hinge has two parallel shafts, the biaxial hinge has characteristics that the biaxial hinge can make a rotational angle of a movable body with respect to a fixed body large compared with a uniaxial hinge.

The biaxial hinge can be used for a table, a counter, a door or a cover of a furniture or a vehicle, or an electronic device such as a notebook computer, for example. In the case of using the biaxial hinge for the table, the biaxial hinge allows a sub-table (a movable body) to rotate with respect to a main table (a fixed body) from a flat position (an opened position) to a folded position (a closed position) by about 180 degrees. In the case of using the biaxial hinge for the counter, the biaxial hinge allows a trap type counter (a movable body) to rotate with respect to a counter main body (a fixed body) from a flat position (an opened position) to a folded position (a closed position) by about 180 degrees. In the case of using the biaxial hinge for the notebook computer, the biaxial hinge allows a display (a movable body) to rotate with respect to a computer main body (a fixed body) from an opened position to a closed position by 90 degrees or more.

This biaxial hinge is required to have a torque generation function for holding the movable body with keeping an arbitrary opening angle of the movable body and/or absorbing impact caused when the movable body is opened or closed.

In addition, the biaxial hinge is required to have a rotation control function for controlling rotation on the side of a first shaft and rotation on the side of a second shaft so as to allow the movable body to perform constant movement when the movable body is opened or closed. The rotation control function means, for example, a function of achieving one movement that a portion on the side of the first shaft first rotates and then a portion on the side of the second shaft rotates when the movable body is opened and another movement that the portion on the side of the second shaft first rotates and then the portion on the side of the first shaft rotates when the movable body is closed.

In order to meet the above-mentioned two requirements, patent literature 1 discloses a biaxial hinge in which damping cylinders each having the torque generation function are respectively press-fitted into the first shaft and the second shaft and one-way clutches each having the rotation control function are incorporated so as to be respectively provided on the damping cylinders of the first shaft and the second shaft.

In the biaxial hinge described in the patent literature 1: JP 2014-62595 A, when the sub-table at the flat position (the opened position) is closed, the portion on the first shaft is first rotated by the one-way clutch on the side of the first shaft by 90 degrees. After that, the portion on the second shaft is rotated against friction of the damping cylinder by 90 degrees. On the other hand, when the sub-table at the folded position (the closed position) is opened, the portion on the side of the second shaft is first rotated by the one-way clutch on the side of the second shaft by 90 degrees and then the portion on the side of the first shaft is rotated against friction of the damping cylinder by 90 degrees.

SUMMARY OF INVENTION

Technical Problem

However, since the biaxial hinge described in the patent literature 1 includes the damping cylinders and the one-way clutches, there is a problem that the biaxial hinge is likely to increase in size. If the biaxial hinge increases in size, the biaxial hinge, which should be inconspicuous actually, becomes conspicuous and a space generated between the movable body and the fixed body in the closed position and the opened position increases.

Therefore, it is an object of the present invention to provide a biaxial hinge which can be downsized.

Technical Solution

In order to solve the above-mentioned problem, one aspect of the present invention relates to a biaxial hinge including a first main body, an intermediate body coupled to the first main body so that the intermediate body can rotate around a first shaft and a second main body coupled to the intermediate body so that the second main body can rotate around a second shaft which is in parallel with the first shaft, comprising: two or more laminated first friction plates engaged with the first shaft in an interference fitting state; and two or more laminated second friction plates engaged with the second shaft in an interference fitting state, wherein the first shaft cannot rotate with respect to one of the first main body and the intermediate body in a clockwise direction and a counterclockwise direction, wherein the first friction plates cannot rotate with respect to the other one of the first main body and the intermediate body in the clockwise direction and the counterclockwise direction, wherein the second shaft cannot rotate with respect to one of the second main body and the intermediate body in the clockwise direction and the counterclockwise direction, and wherein the second friction plates cannot rotate with respect to the other one of the second main body and the intermediate body in the clockwise direction and the counterclockwise direction.

Advantageous Effects

According to the present invention, since the first friction plates and the second friction plates respectively engage with the first shaft and the second shaft in the interference fitting state, it is possible to provide the torque generation function. Further, the first friction plates and the second friction plates are a laminated type and thus the torque generated to the first shaft and the second shaft can be easily controlled by adjusting the numbers of the laminated first friction plates and the laminated second friction plates, and thereby it is possible to provide the rotation control function. Since the one-way clutches are unnecessary, it is possible to downsize the biaxial hinge.

BRIEF DESCRIPTION OF DRAWINGS

FIG. 5A shows a state before a pin is inserted and FIG. 5B shows a state after the pin is inserted).

DESCRIPTION OF EMBODIMENTS

Hereinafter, detailed description will be given to a biaxial hinge according to an embodiment of the present invention based on the accompanying drawings. In this regard, the biaxial hinge of the present invention can be embodied in various aspects and is not limited to the embodiment described in this specification. This embodiment is provided with intent to sufficiently provide the disclosure of this specification for facilitating a person having ordinary skill in the art to sufficiently understand the scope of the present invention.

Figure 1:
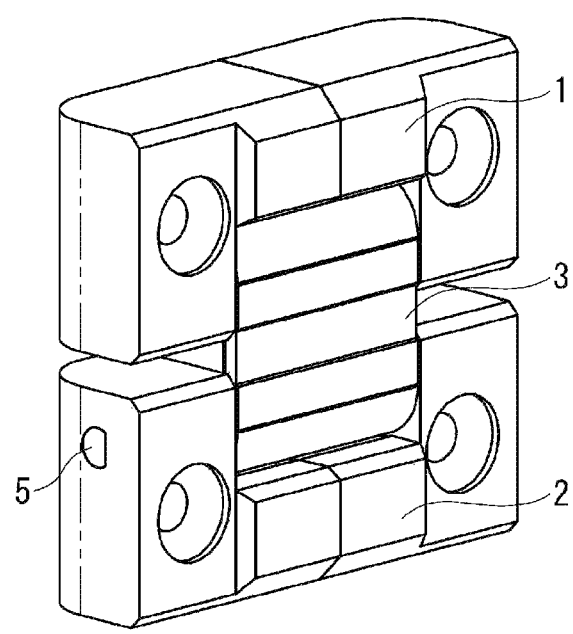
FIG. 1 is an external perspective view of a biaxial hinge according to one embodiment of the present invention.

FIG. 1 shows an external perspective view of the biaxial hinge according to one embodiment of the present invention. The biaxial hinge includes a first main body 1, an intermediate body 3 and a second main body 2. The intermediate body 3 is coupled to the first main body 1 so that the intermediate body 3 can rotate around a first shaft 4 (see FIG. 3). The second main body 2 is coupled to the intermediate body 3 so that the second main body 2 can rotate around a second shaft 5 (see FIG. 3). The first shaft 4 and the second shaft 5 are in parallel with each other. The first main body 1 should be attached to a movable body. The second main body 2 should be attached to a fixed body.

Figure 2:
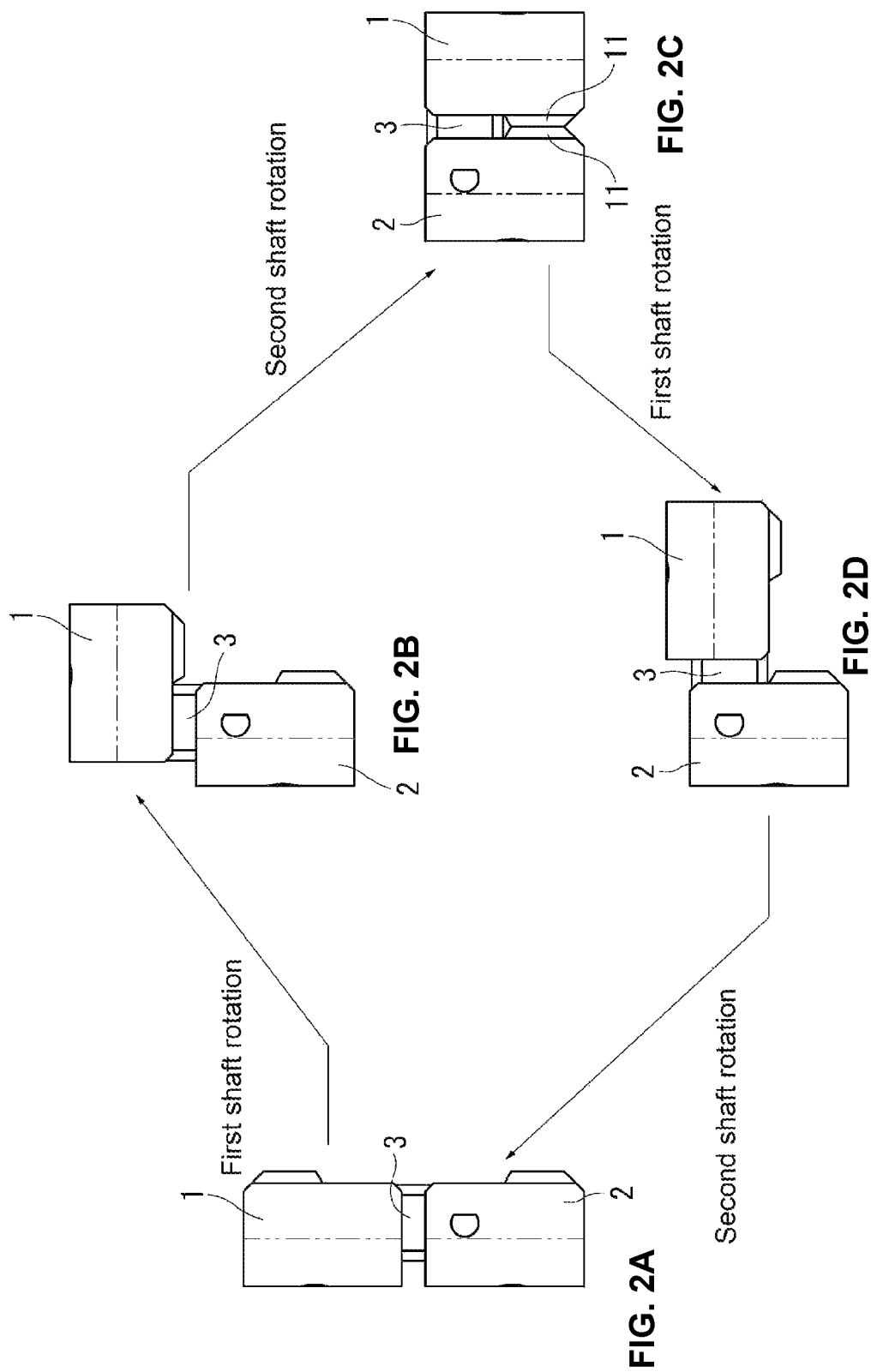
FIGS. 2A to 2D are an operation diagram of the biaxial hinge according to this embodiment (FIG. 2A shows a closed position, FIG. 2B shows a position at the time when the biaxial hinge rotates from the closed position toward an opening direction by 90 degrees, FIG. 2C shows an opened position and FIG. 2D shows a position at the time when the biaxial hinge rotates from the opened position toward a closing direction by 90 degrees).

FIGS. 2A to 2D show operation diagram of the biaxial hinge at the time of opening and closing the movable body. Although detailed matters are described later, torque generated to the first shaft 4 due to friction is set to be smaller than torque generated to the second shaft 5 due to friction. Thus, when the movable body at a closed position shown in FIG. 2A is opened (in other words, when the first main body 1 is rotated in the clockwise direction), the first main body 1 first rotates with respect to the intermediate body 3 by 90 degrees as shown in FIG. 2B. When the first main body 1 rotates by 90 degrees, the first main body 1 makes contact with the intermediate body 3 and thereby the rotation of the first shaft 4 with respect to the intermediate 3 equal to or over 90 degrees becomes impossible. When the movable body is further opened (when the first main body 1 is further rotated in the clockwise direction), the intermediate body 3 rotates with respect to the second main body 2 by 90 degrees as shown in FIG. 2C. At an opened position of the movable body shown in FIG. 2C, a stopper 11 of the first main body 1 makes contact with a stopper 11 of the second main body 2 and thereby the rotation of the intermediate body 3 equal to or over 90 degrees is restricted.

On the other hand, when the movable body at the opened position shown in FIG. 2C is closed (in other words, when the first main body 1 is rotated in the counterclockwise direction), the first main body 1 first rotates with respect to the intermediate body 3 by 90 degrees as shown in FIG. 2D. When the first main body 1 rotates by 90 degrees, the first main body 1 makes contact with the intermediate body 3 and thereby the rotation of the first shaft 4 with respect to the intermediate body 3 equal to or over 90 degrees becomes impossible. When the movable body is further closed (when the first main body 1 is further rotated in the counterclockwise direction), the intermediate body 3 rotates 90 degrees as shown in FIG. 2A. At the closed position of the movable body shown in FIG. 2A, the first main body 1 and the second main body 2 make contact with the intermediate body 3 and thereby the rotation of the intermediate body 3 equal to or over 90 degrees is restricted.

Figure 3:
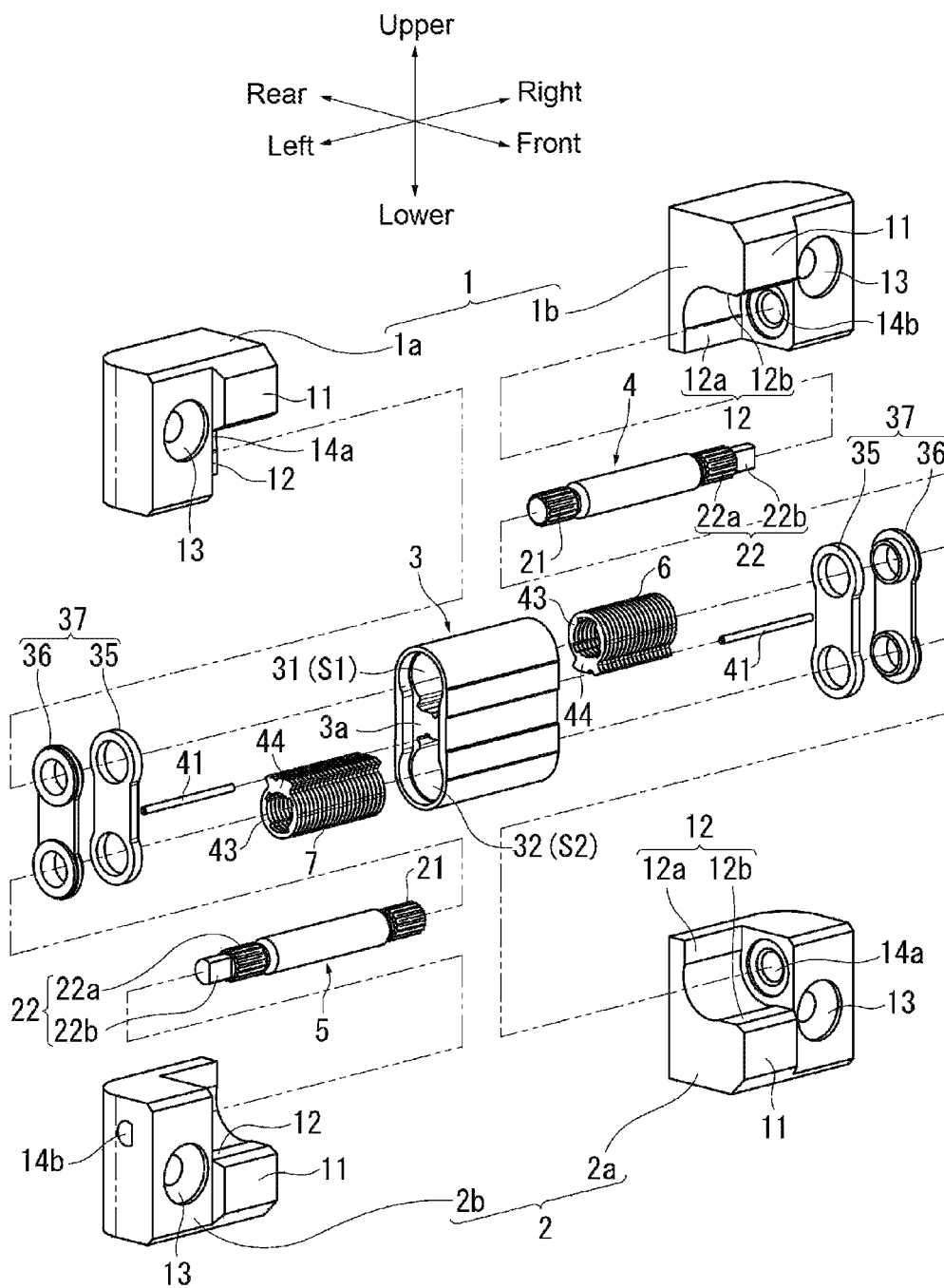
FIG. 3 is an exploded perspective view of the biaxial hinge according to this embodiment.

FIG. 3 shows an exploded perspective view of the biaxial hinge. A reference sign 1 represents the first main body, a reference sign 2 represents the second main body, a reference sign 3 represents the intermediate body, a reference sign 4 represents the first shaft, a reference sign 5 represents the second shaft, a reference sign 6 represents laminated first friction plates and a reference sign 7 represents laminated second friction plates. In this regard, for the purpose of illustration, a configuration of the biaxial hinge is explained in the following description with using directions seen from a direction perpendicular to a vertical plane on which the biaxial hinge at the closed position is located, that is with using the upper-lower direction, the left-right direction and the front-rear direction in FIGS. 2A to 2D. Of course, an arrangement of the biaxial hinge is not limited to such an arrangement.

The first main body 1 is constituted of a pair of first divided bodies 1a, 1b divided into two. Each of the first divided bodies 1a, 1b is formed into a substantially rectangular parallelepiped shape as a whole and a cutout 12 for avoiding an interference with the intermediate body 3 is formed in a corner of each of the first divided bodies 1a, 1b. A hole 13 through which a fastening member such as a screw for attaching each of the first divided bodies 1a, 1b to the movable body is formed in each of the first divided bodies 1a, 1b.

The cutout 12 includes a first bottom surface 12a and a second bottom surface 12b perpendicular to each other. Each of the first divided bodies 1a, 1b can rotate with respect to the intermediate body 3 in the range of about 90 degrees. When the first divided bodies 1a, 1b are at the closed position, the first bottom surfaces 12a of the first divided bodies 1a, 1b make contact with the intermediate body 3. When the first divided bodies 1a, 1b rotate by 90 degrees, the second bottom surfaces 12b of the first divided bodies 1a, 1b make contact with the intermediate body 3. The protruding stopper 11 is formed on a front surface of each of the first divided bodies 1a, 1b. When the stoppers 11 of the first divided bodies 1a, 1b make contact with stoppers 11 of second divided bodies 2a, 2b, the opened position of the movable body (see FIG. 2C) is defined.

Both end portions of the first shaft 4 in an axial direction thereof are unrotatably and respectively supported by the first divided bodies 1a, 1b. Rotation locking portions 21, 22 are respectively formed on the both end portions of the first shaft 4 in the axial direction thereof by knurling process, for example. Each of the rotation locking portions 21, 22 is constituted of a plurality of protruded lines and/or groove lines formed on an outer circumferential surface of the first shaft 4 and extending in the axial direction of the first shaft 4. As a part of the rotation locking portion 22, a flat portion 22b is also formed on the other end portion of the first shaft 4 in addition to a rotation locking portion 22a formed by the knurling process.

A hole 14a into which the one end portion of the first shaft 4 is inserted is formed on the first divided body 1a. A rotation locking portion having a shape corresponding to the one end portion of the first shaft 4 is formed in the hole 14a. A hole 14b into which the other end portion of the first shaft 4 is inserted is formed on the first divided body 1b. A rotation locking portion having a shape corresponding to the other end portion of the first shaft 4 is formed in the hole 14b. By respectively inserting the rotation locking portions 21, 22 respectively formed on the both end portions of the first shaft 4 into the first divided bodies 1a, 1b, the first shaft 4 becomes impossible to rotate with respect to the first main body 1 in both of the clockwise direction and the counterclockwise direction.

The second main body 2 is also constituted of a pair of second divided bodies 2a, 2b divided into two. The second divided body 2a has the same shape as the first divided body 1a and the second divided body 2b has the same shape as the first divided body 1b. The same reference signs as the portions of the first divided bodies 1a, 1b are respectively attached to corresponding portions of the second divided bodies 2a, 2b and detailed description for each portion of the second divided bodies 2a, 2a is omitted.

The second shaft 5 also has the same shape as the first shaft 4. The same reference signs as the portions of the first shaft 4 are respectively attached to corresponding portions of the second shaft 5 and detailed description for each portion of the second shaft 5 is omitted.

Figure 4:
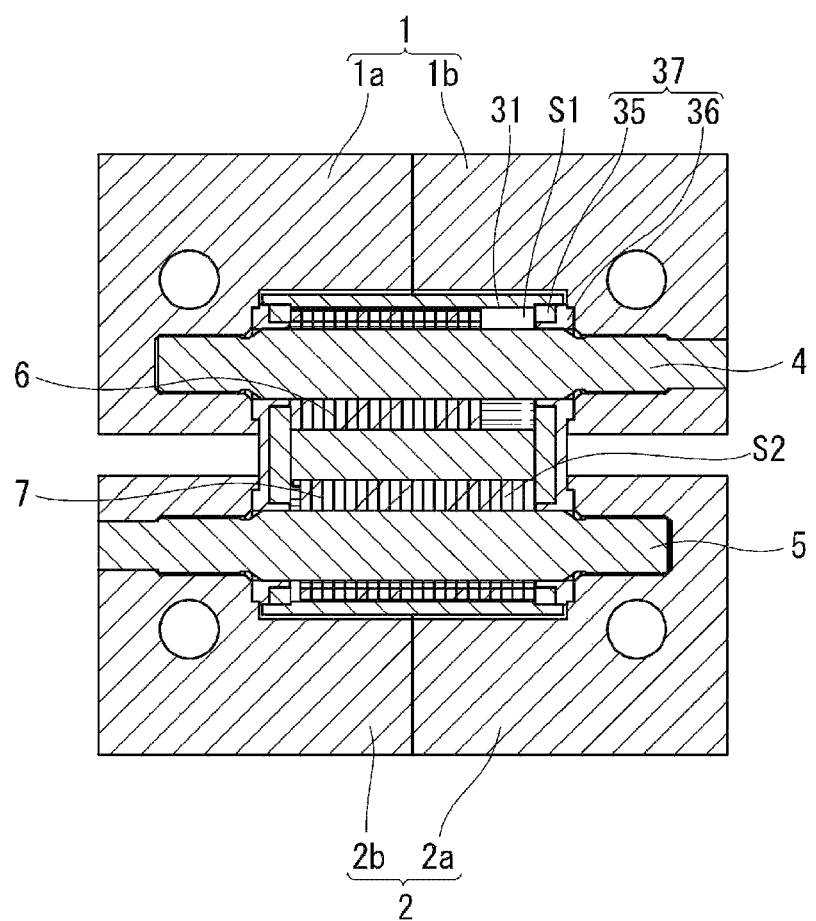
FIG. 4 is a vertical cross-sectional view of the biaxial hinge according to this embodiment.

The intermediate body 3 is formed into a horizontally long rectangular parallelepiped shape as a whole and formed into a shape whose upper and lower ends are rounded. A through-hole 31 constituting a first containing portion for containing the first friction plates 6 therein is formed on the intermediate body 3. A though-hole 32 constituting a second containing portion for containing the second friction plates 7 therein is also formed on the intermediate body 3. Concave portions 3a are respectively formed on both end surfaces of the intermediate body 3 in an axial direction thereof. Covers 37 for closing the through-holes 31, 32 are respectively fitted into these concave portions 3a. As shown in the cross-sectional view of FIG. 4, a first containing portion S1 and a second containing portion S2 are defined by the through-hole 31, 32 and the covers 37. A size of the first containing portion S1 is equal to a size of the second containing portion S2 and each of the first containing portion S1 and the second containing portion S2 can contain the same number of the friction plates 6, 7 therein.

As shown in FIG. 3, each of the covers 37 includes a metallic portion 35 and a resin portion 36. Each of the metallic portion 35 and the resin portion 36 is formed into a vertically long plate-like shape corresponding to the concave portion 3a on the end surface of the intermediate body 3. Holes through which the first shaft 4 and the second shaft 5 are respectively passed are formed in each of the metallic portion 35 and the resin portion 36. The resin portions 36 make contact with the first main body 1 and the second main body 2.

All of the intermediate body 3, the first main body 1 and the second main body 2 are made of a metallic material. By providing the resin portions 36 in the covers 37 for closing the first containing portion S1 and the second containing portion S2 of the intermediate body 3, it is possible to prevent slide movement between the metallic members.

Two or more first friction plates 6 are contained in the first containing portion S1 so that the first friction plates 6 cannot rotate. The first friction plates 6 are laminated in the axial direction of the first shaft 4. Torque which is proportional to the number of the laminated first friction plates 6 is generated to the first shaft 4 which relatively rotates. Two or more second friction plates 7 are contained in the second containing portion S2 so that the second friction plates 7 cannot rotate. The second friction plates 7 are laminated in the axial direction of the second shaft 5. Torque which is proportional to the number of the laminated second friction plates 7 is generated to second shaft 5 which relatively rotates.

A shape of each of the first friction plates 6 is identical to a shape of each of the second friction plates 7. In this embodiment, in order to make the torque generated to the first shaft 4 different from the torque generated to the second shaft 5, the number of the laminated first friction plates 6 is set to be different from the number of the laminated second friction plates 7. In particular, the number of the laminated first friction plates 6 is set to be smaller than the number of the laminated second friction plates 7.

Figure 5A:
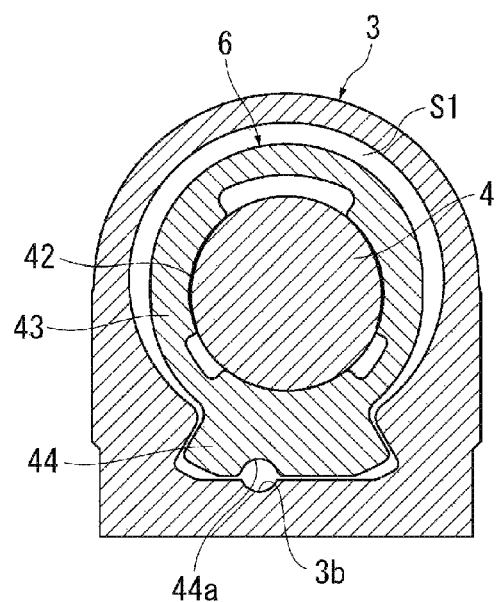
FIGS. 5A and 5B are detailed view showing a first friction plate contained in a first containing portion of an intermediate body
Figure 5B:
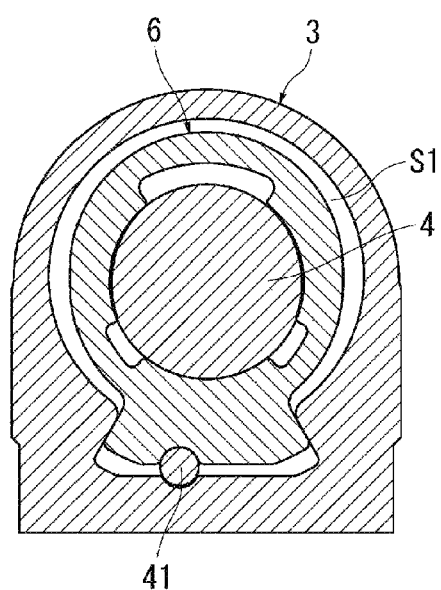

FIGS. 5A and 5B show the first friction plate 6 contained in the first containing portion S1 of the intermediate body 3. FIG. 5A shows a state before a pin 41 is inserted and FIG. 5B shows a state after the pin 41 is inserted. The first friction plate 6 has a ring-shaped surrounding portion 43 defining a shaft opening portion 42 through which the first shaft 4 is passed and a wedge-shaped rotation locking portion 44 integrally formed with the surrounding portion 43. The first friction plate 6 is produced by using punching process with respect to a thin plate. The surrounding portion 43 is engaged with the surrounding portion 43 in an interference fitting state so as to generate the torque with respect to the first shaft 4 which relatively rotates. A cutout 44a into which the pin 41 is inserted is formed on the surrounding portion 44 of the first friction plate 6. A cutout 3b into which the pin 41 is inserted is formed in the intermediate body 3.

As shown in FIG. 5A, the first friction plates 6 are fitted into the first containing portion S1 in a state that a space exists in the first containing portion S1. By inserting the pin 41 between the cutouts 44a, 3b after the first friction plates 6 have been fitted into the first containing portion S1, the first friction plates 6 are fixed to the intermediate body 3 as shown in FIG. 5B.

The shape of each of the second friction plates 7 is identical to the shape of each of the first friction plates 6. The second friction plates 7 are also fixed to the intermediate body 3 by the pin 41 as is the case with the first friction plates 6. As shown in FIG. 3, the rotation locking portions 44 of the first friction plates 6 and the rotation locking portions 44 of the second friction plates 7 face with each other. With this configuration, it is possible to downsize the intermediate body 3 and therefore downsize the biaxial hinge.

As shown in FIG. 3, after the first friction plates 6 and the second friction plates 7 have been fixed to the intermediate body 3, the first containing portion S1 and the second containing portion S2 are closed by the covers 37. After that, the first shaft 4 is passed through the first friction plates 6 and the covers 37 and the second shaft 5 is passed through the second friction plates 7 and the covers 37. After that, the first divided bodies 1a, 1b divided into two are respectively attached to the both end portions of the first shaft 4 and the second divided bodies 2a, 2b divided into two are respectively attached to the both end portions of the second shaft 5. By respectively dividing the first main body 1 and the second main body 2 into two, assembling becomes easier.

In this regard, the surrounding portions 44 of the first friction plates 6 and the second friction plates 7 may be directly press-fitted into the first containing portion S1 and the second containing portion S2 and the pins 41 may be omitted. Further, each of the surrounding portions 43 may be constituted of a pair of arc-shaped arms.

Figure 6A:
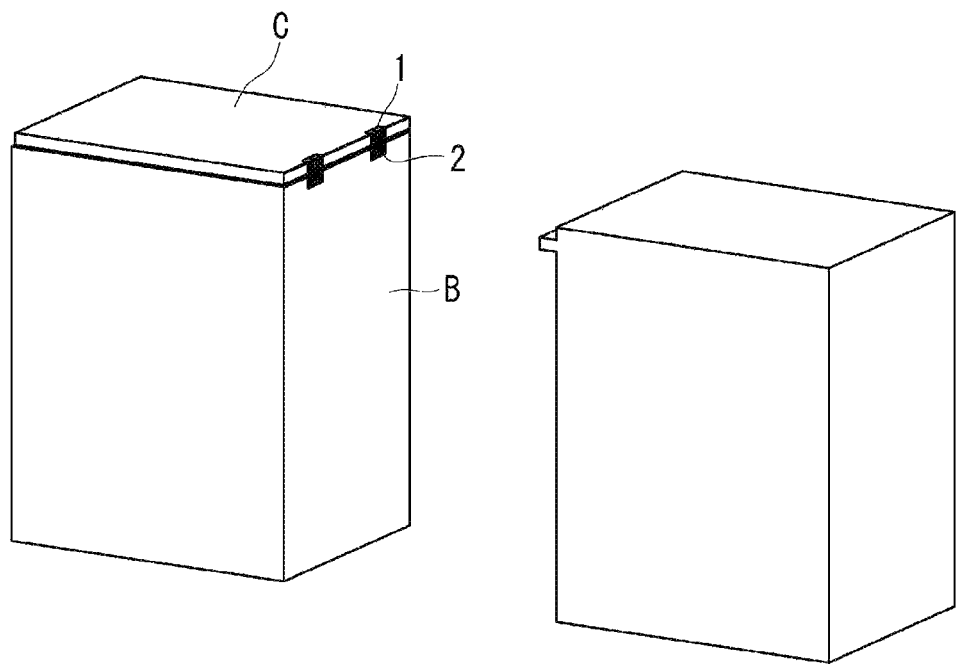
FIGS. 6A and 6B are view showing an example in which the biaxial hinge of this embodiment is applied to a trap type counter (FIG. 6A shows a closed position of the trap type counter and FIG. 6B shows an opened position of the trap type counter).
Figure 6B:
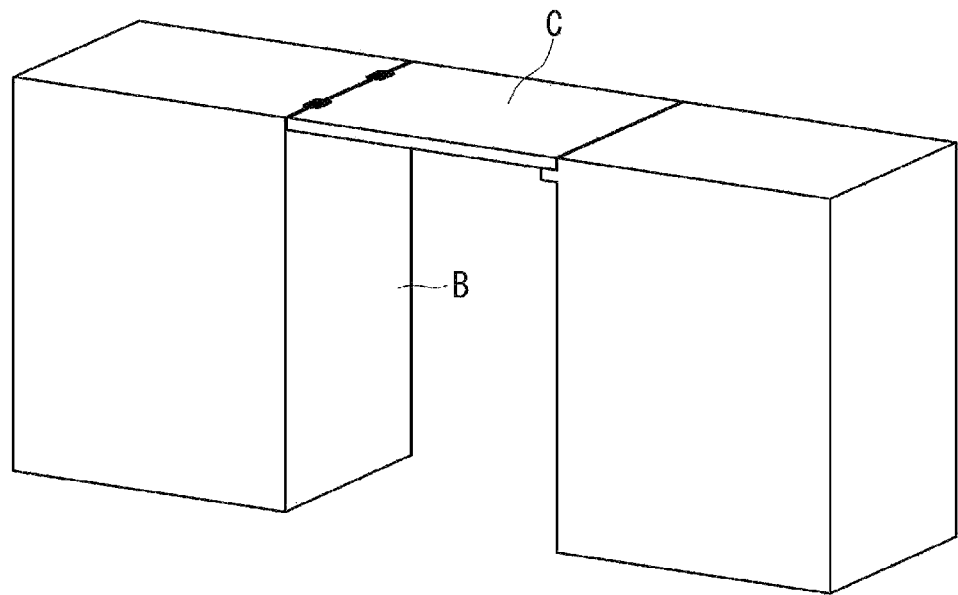

FIGS. 6A and 6B show an example in which the biaxial hinge according to this embodiment is applied to a trap type counter. FIG. 6A shows a closed position (a folded position) of the trap type counter and FIG. 6B shows an opened position (a flat position) of the trap type counter. As shown in FIG. 6A, the first main body 1 is attached to an end surface of a trap type counter C. The second main body 2 is attached to an end surface of a counter main body B.

When the trap type counter C at the closed position shown in FIG. 6A is opened, the first shaft 4 first rotates and then the second shaft 5 rotates as described with reference to FIGS. 2A to 2D. Then, the trap type counter C rotates to the opened position shown in FIG. 6B. On the other hand, when the trap type counter C at the opened position shown in FIG. 6B is opened, the first shaft 4 first rotates and then the second shaft 5 rotates. Thus, it is possible to control the rotations of the first shaft 4 and the second shaft 5 when the trap type counter C is opened or closed.

Further, since the torque due to the friction is generated to the first shaft 4 and the second shaft 5 when the trap type counter C is opened and when the trap type counter C is closed, it is possible to hold the trap type counter C with keeping an arbitrary opening angle and/or absorb impact when the trap type counter C is opened or closed.

By using the biaxial hinge according to this embodiment, it becomes possible to downsize the biaxial hinge and reduce a space generated between the counter main body B and the trap type counter C at the closed position shown in FIG. 6A and the opened position shown in FIG. 6B of the trap type counter C.

In this regard, the present invention is not limited to the aspect embodied by the above-described embodiment and the present invention can be modified into various embodiments within a range of not changing the spirit of the present invention.

Although the first shaft is coupled to the first main body so that the first shaft cannot rotate and the first friction plates are coupled to the intermediate body so that the first friction plates cannot rotate in the above-mentioned embodiment, the first shaft may be coupled to the intermediate body so that the first shaft cannot rotate and the first friction plates may be coupled to the first main body so that the first friction plates cannot rotate. In the same manner, the second shaft may be coupled to the intermediate body so that the second shaft cannot rotate and the second friction plates may be coupled to the second main body so that the second friction plates cannot rotate.

Although the number of the first friction plates is set to be different from the number of the second friction plates in the above-mentioned embodiment, the number of the first friction plates may be set to be identical to the number of the second friction plates. In this case, the first shaft and the second shaft simultaneously rotate.

The biaxial hinge of the present invention can be applied to a table, a counter, a door or a cover of a furniture or a vehicle, an electronic device such as a notebook computer, a cover of a machine such as a semiconductor manufacturing equipment and the like.

This specification is based on Japanese patent application JP 2016-207441 filed on Oct. 24, 2016. The entire of disclosure of JP 2016-207441 is incorporated herein by reference.

REFERENCE SIGNS LIST

1 . . . First main body
1a, 1b . . . First divided body
2 . . . Second main body
2a, 2b . . . Second divided body
3 . . . Intermediate body
4 . . . First shaft
5 . . . Second shaft
6 . . . First friction plate
7 . . . Second friction plate
37 . . . Cover
35 . . . Metallic portion of cover
36 . . . Resin portion of cover
42 . . . Shaft opening portion
43 . . . Surrounding portion
44 . . . Rotation locking portion
S1 . . . First containing portion
S2 . . . Second containing portion

What is claimed is:

1. A biaxial hinge including a first main body, an intermediate body coupled to the first main body so that the intermediate body can rotate around a first shaft and a second main body coupled to the intermediate body so that the second main body can rotate around a second shaft which is in parallel with the first shaft, comprising:
   two or more laminated first friction plates engaged with the first shaft in an interference fitting state; and
   two or more laminated second friction plates engaged with the second shaft in an interference fitting state,
   wherein the first shaft cannot rotate with respect to one of the first main body and the intermediate body in a clockwise direction and a counterclockwise direction,
   wherein the two or more first friction plates cannot rotate with respect to the other one of the first main body and the intermediate body in the clockwise direction and the counterclockwise direction, torque proportional to the number of the two or more first friction plates is generated to the first shaft which relatively rotates,
   wherein the second shaft cannot rotate with respect to one of the second main body and the intermediate body in the clockwise direction and the counterclockwise direction,
   wherein the two or more second friction plates cannot rotate with respect to the other one of the second main body and the intermediate body in the clockwise direction and the counterclockwise direction, torque proportional to the number of the two or more second friction plates is generated to the second shaft which relatively rotates, and
   wherein a shape of each of the first friction plates is identical to a shape of each of the second friction plates.

2. The biaxial hinge claimed in claim 1, wherein the number of the first friction plates is different from the number of the second friction plates.

3. The biaxial hinge claimed in claim 2, wherein the intermediate body has a first containing portion for containing the first friction plates therein so that the first friction plates cannot rotate and a second containing portion for containing the second friction plates therein so that the second friction plates cannot rotate, wherein the first shaft passes through the first containing portion and is supported by the first main body which is divided into two so that the first shaft cannot rotate, and wherein the second shaft passes through the second containing portion and is supported by the second main body which is divided into two so that the second shaft cannot rotate.

4. The biaxial hinge claimed in claim 1, wherein the intermediate body has a first containing portion for containing the first friction plates therein so that the first friction plates cannot rotate and a second containing portion for containing the second friction plates therein so that the second friction plates cannot rotate, wherein the first shaft passes through the first containing portion and is supported by the first main body which is divided into two so that the first shaft cannot rotate, and wherein the second shaft passes through the second containing portion and is supported by the second main body which is divided into two so that the second shaft cannot rotate.

5. The biaxial hinge claimed in claim 4, wherein each of the first friction plates and the second friction plates has a surrounding portion for defining shaft opening portions through which the first shaft and the second shaft respectively pass and a wedge-shaped rotation locking portion integrally formed with the surrounding portion, and wherein the rotation locking portions of the first friction plates and the rotation locking portions of the second friction plates face with each other.

6. The biaxial hinge claimed in claim 5, wherein the intermediate body has a cover portion for closing the first containing portion and the second containing portion, and wherein a portion of the cover portion sliding on the first main body and a portion of the cover portion sliding on the second main body are made of a resin material.

7. The biaxial hinge claimed in claim 4, wherein the intermediate body has a cover portion for closing the first containing portion and the second containing portion, and wherein a portion of the cover portion sliding on the first main body and a portion of the cover portion sliding on the second main body are made of a resin material.

\* \* \* \* \*